United States Patent [19]
Short

[11] 3,771,510
[45] Nov. 13, 1973

[54] COOKING AND BROILING APPARATUS

[76] Inventor: D. Emmett Short, Spring Creek Farm, R.D. No. 2, Box 318, Quakertown, Pa. 18951

[22] Filed: Nov. 21, 1972

[21] Appl. No.: 308,525

[52] U.S. Cl. .................... 126/41 R, 99/393, 99/400, 126/25
[51] Int. Cl. ............................................ A47j 37/07
[58] Field of Search .................. 126/25, 41; 99/393, 99/400

[56] References Cited
UNITED STATES PATENTS
2,898,846  8/1959  Del Francia ..................... 126/41 X
3,244,163  4/1966  McGlaughlin ........................ 126/25

*Primary Examiner*—Edward G. Favors
*Attorney*—Frederick J. Olsson

[57] ABSTRACT

A gas type commercial appliance having a grill which can be easily and rapidly set up horizontally to accept utensils for cooking, or alternatively tilted for the broiling of edibles and including an air cooling means for the gas control valve to prevent the same from binding under various cooking conditions whereby to insure that the same is instantly adjustable.

6 Claims, 5 Drawing Figures

COOKING AND BROILING APPARATUS

This invention relates to gas fired cooking and broiling apparatus for use in restaurants and the like. More specifically the invention relates to improvements in such apparatus particularly in mechanism for tilting the grill and in mechanism for cooling the valve controlling the gas feed.

One object of the invention is to provide in cooking and broiling apparatus simple, reliable, easily operated and inexpensive mechanism for selectively positioning the grill in a level position or in a tilted position.

Another object of the invention is to provide in cooking and broiling apparatus mechanism for selectively positioning the grill in a level position or in a tilted position and having a construction which minimizes the likelihood of the operator burning his hands.

Another object of the invention is to provide in cooking and broiling apparatus, grill positioning mechanism of the kind in question arranged whereby the grill may be selectively tilted in any one of a plurality of positions.

Another object of the invention is to provide in gas-fired grill type cooking and broiling apparatus of the kind in question, mechanism to cool the gas-control valve and prevent the same from binding so that the valve is instantly usable for a change from one type of cooking or broiling condition to another.

Another object of the invention is to provide in tilting grill cooking apparatus a simplified, reliably operating air-flow mechanism to relieve the heat build-up around the gas-control valve when the grill is tilted.

Other objects and advantages of the invention will be apparent from the description below taken in conjunction with the following drawings wherein.

Figure 1:
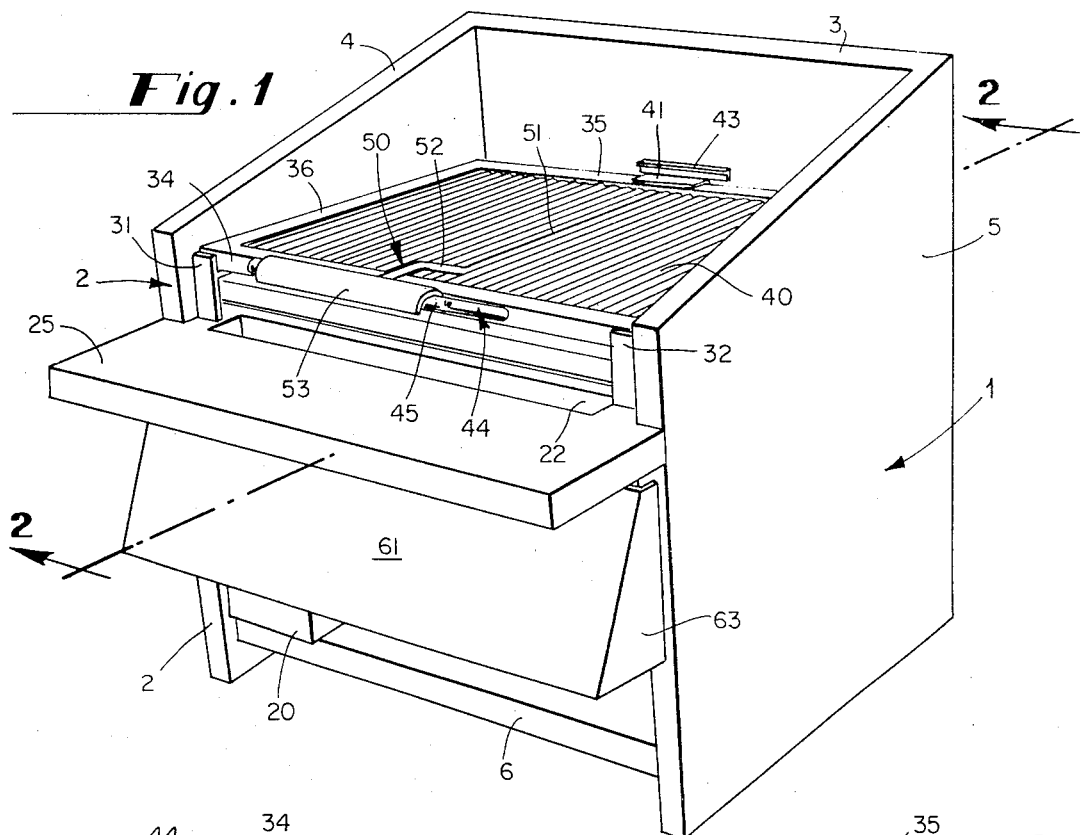
FIG. 1 is a perspective view of cooking and broiling apparatus embodying the invention.
Figure 2:
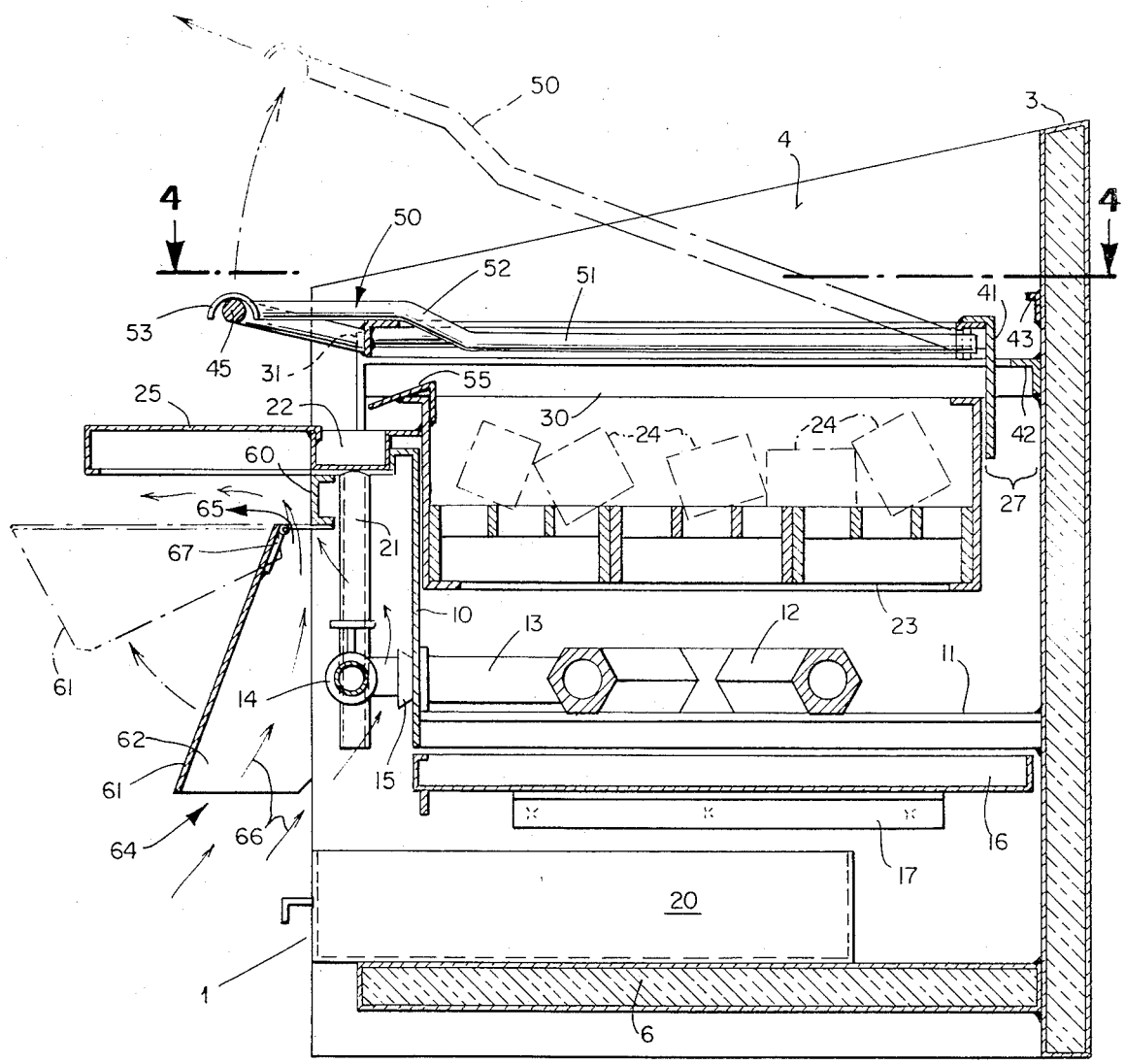
FIG. 2 is a sectional elevational view taken along the lines 2—2 of FIG. 1 and showing the grill in a level or horizontal position.

In FIGS. 1 and 2 the cooking and broiling apparatus includes the body 1 having a front section 2, a back section 3, side sections 4 and 5 and bottom section 6. The front section 1 includes the mounting bracket 10 (FIG. 2) connected to the sides 4 and 5. The bracket 10 extends downwardly and supports one side of the burner platform 11. The other side of the burner platform 11 is supported on the back 5.

Mounted on the burner platform is the gas burner 12. The gas feed tube 13 for the burner extends toward the front 2 and is connected to the bracket 10. The gas feed tube 13 is connected to a gas line (not shown) and the gas to the burner 12 is controlled by the valve 14. The air mixing bonnet is indicated at 15.

Below the burner 12 is a waste collection pan 16 supported by angles on the sides 4 and 5. One of the angles is indicated at 17. The pan 16 may be pulled out to the left for cleaning. Below the pan 16 and resting on the bottom 6 is a grease box 20 which can be removed for cleaning by pulling out to the left. The pan is fed through the tube 21 connected to the grease manifold 22 supported by the mounting bracket 10. The manifold catches grease dripping from the grill as will be noted hereinafter. Above the burner 12 is a grate 23 supported on the sides 4 and 5 by means not shown. The grate carries the ceramics 24. Extending out from the front section of the cooker is a table 25 which is supported by the mounting bracket 10.

On each of the sides 4 and 5 is a track means. The track means on side 4 is indicated at 30. On each track adjacent the front section 2 there is an upstanding barrier. As noted in FIG. 1 the barrier for the track 30 is indicated at 31 and the barrier for the opposite track is indicated at 31. The tracks support the grill 33 in a level or horizontal position above the heat source comprising the burner 12 and the ceramics 24.

The grill is generally rectangular in shape being comprised on angle pieces welded to form a front 34, a back 35, a side 36 and side not shown opposite to the side 36. The front 34 is disposed adjacent the front section 2 of the body and the sides are disposed adjacent the sides 4 and 5 of the body. The back 35 of the grill is adjacent to back 3 but substantially spaced therefrom as indicated at 27 in FIG. 2. The rods 40 extend between the front 34 and the back 35. The opposite ends of the rods are welded to the angles of the front 34 and the back 35.

Figure 4:
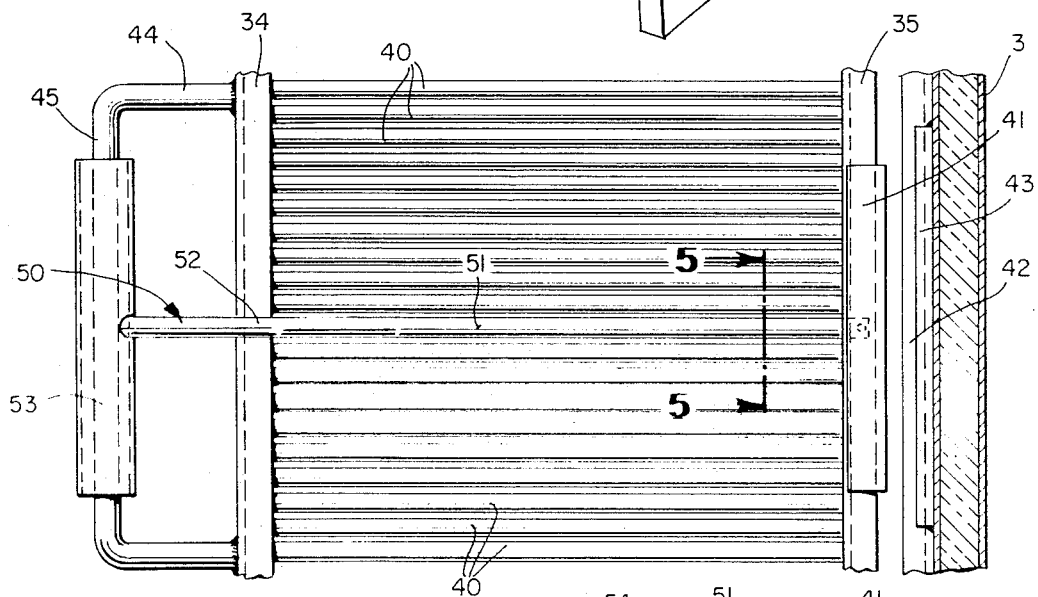
FIG. 4 is a planar view taken along the lines 4—4 of FIG. 2.

On the back 35 of the grill (FIG. 2) is a tilt leg 41 which extends down into the space 37. The leg 41 is adapted to be placed on support means comprising the stage 42 and stage 43 (FIG. 2) connected to the back 5 for purposes of tilting as will be explained shortly. A push-pull handle 44 is welded to the front 34. Section 45 (FIG. 4) of the push-pull handle 44 runs generally parallel to the front 34 of the grill.

The tilt handle of the grill is generally designated at 50. The tilt handle includes the bar section 51 which extends from the back 35 parallel to the bars 40 and the upper section 52 which extends upwardly over the front 34 and carries the head 53 at its outer end. The head 53 rests on the section 45. Note that the bar section 51 effectively becomes part of the grill.

Figure 5:
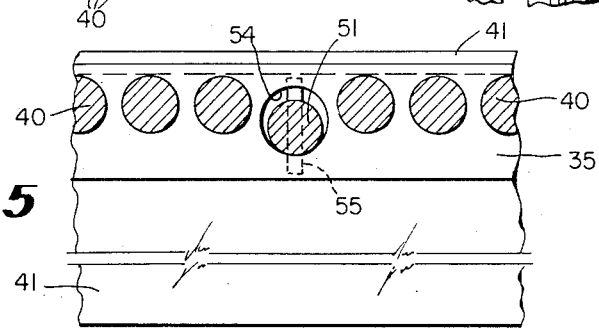
FIG. 5 is an enlarged fragmentary view taken along the lines 5—5 of FIG. 4.

The tilt handle is pivotally connected to the back 35 by the following arrangement. With reference to FIG. 5 the back 35 has an aperture 54 which is larger in diameter than the bar 51. This allows the bar 51 freedom of motion. By grasping the head 53, the tilt handle can be swung up to the position shown by the dot-dash lines in FIG. 2. To prevent the tilt handle from being pulled out of the bar 51, the bar has a pin 55 which is larger than the diameter of the aperture 54.

As will be understood the flame from the gas burner 12 heats up the ceramics 24 supported on the grate 23 underneath the grill 33. The ceramics provide a more-or-less constant source of heat for raising the temperature of utensils or edibles supported by the grill. In the level or horizontal position as shown in FIGS. 1 and 2, one or more utensils such as pots or pans can be put on the grill and used for cooking.

Ordinarily, the level position of the grill is not satisfactory for the broiling of edibles because all excess fats and juices drip directly down onto the ceramic or even down onto the burner 12 and this can cause undesireable smoke conditions and even fire. Some drainage of fats and juices onto the ceramics is desirable to obtain the effect of charcoal cooking as by the co-action between the fats and the ceramic. Therefore, it is desireable to control the amount of fats and juices dripping down. This is done by tilting the grill so that there is some drip on the ceramics, but most of the fats and juices run down the rods 40 toward the front 34 to be collected in the grease pan 20 and avoid the excessive burning mentioned above.

Most of the cooking and broiling devices of the kind in question employ relatively complicated or cumbersome mechanisms to obtain the selective grill tilt. The structure described herein materially simplifies the construction and arrangement of the grill positioning mechanism, making it possible to rapidly achieve the multi-positions by a combination of motions easily performed by the operator as will be understood from the following.

Figure 3:
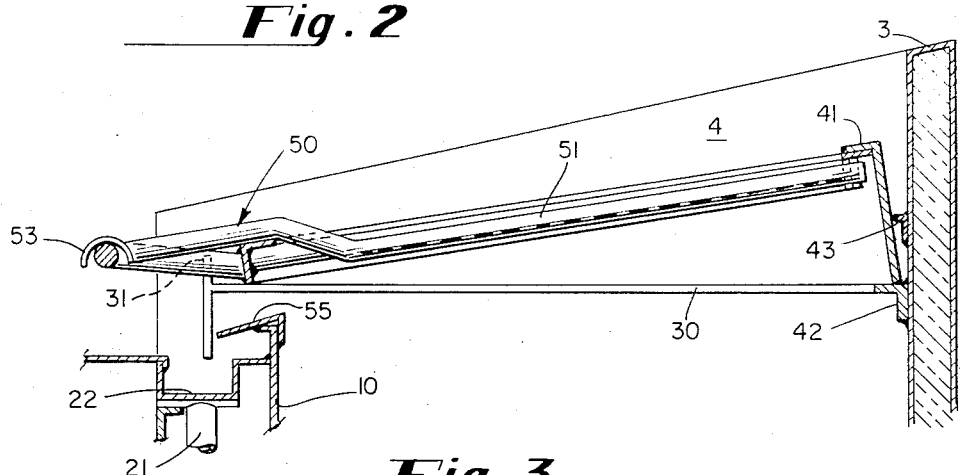
FIG. 3 is a fragmentary view of the top part of FIG. 2 showing the grill in a tilted position.

To tilt the grill the operator grasps the head 53 and lifts the lift handle upwardly to the dash-dot position such as shown in FIG. 2. He then pulls back on the lift handle so that the front 34 of the grill abuts the barriers 31 and 32 and then continues pulling so that the grill tilts upwardly around the barriers as pivots. The operator continues this motion until the leg 41 is above the support means, either the stage 42 or the stage 43. At that time, the operator takes his other hand and pushes on the push-pull handle 44 to move the grill and tilt handle slightly toward the back. The operator then eases up on the lift handle 50 so that the leg moves down and rests on either the stage 42 or the stage 43 depending upon the amount of tilt desired. The grill then is in the desired position for broiling. The position of the grill on the stage 42 is shown in FIG. 3. In this position most of the juices and fats run down the grill toward the front and on coming to the front 34 drip down into the drip ledge 55 supported on the bracket 10 and from the drip ledge 55 drip down into the manifold 22.

After the grill has been tilted, the tilt handle 50 is moved downwardly so that the head 53 again rests on the section 45 as shown in the full line position of FIG. 2. To put the grill back into the horizontal position, the tilt handle 50 is rotated upwardly, the push-pull handle pulled to move the grill and tilt-handle to the front or until the grill strikes the barriers. The grill is then eased down on the tracks 30 and then the tilt handle put into the full line position of FIG. 2.

It will be noted that the section 52 is raised substantially away from the other bars and the handle 44 is spaced substantially away from the grill proper and this provides for air circulation and heat radiation for cooling purposes. Also the head 53 has a large-area contour and this helps in maintaining desireable head temperature. The foregoing structure minimizes the chances of the operator burning his hands when changing the grill position.

Another feature of the invention is the structure for air cooling the control valve 14. This is especially useful in the tilt position wherein the grill will ordinarily be filled with meat to be broiled. This condition tends to maintain a good deal of the heat within the body of the apparatus. Consequently, there is greater chance of the temperature of the control valve being raised to the point where it binds and cannot be operated until it has cooled down.

Another advantage of the cooling arrangement is that it eliminates the chance of binding of the valve at the time the furncace is first started up in the morning. Ordinarily for morning operation the gas burner is turned up to full capacity so to quickly heat up the charcoals. Under such conditions, the excess heat may cause binding of the valve and consequently the inability of cooling down the apparatus unless the gas supply is terminated for a period of time.

The cooling means includes the bracket means 60 connected to the sidewalls 4 and 5 and supporting the skirt 61 which extends across the front of the body (FIG. 1) and has a side piece 62 (FIG. 2) and side piece 63 (FIG. 1) which extend inwardly and respectively abut the sides 4 and 5 or the front of the body.

As will be apparent from an inspection of FIG. 2, the bracket means and the side pieces maintain the skirt away from the front of the body to provide an air passage comprising the air inlet 64 on the bottom and air outlet 65 on the top. As noted by the arrows 66 the air enters the bottom inlet 64 and flows upwardly over the control valve 14 and then exits through the outlet 65.

To provide easy access to the valve 14 it is preferable that the skirt be tiltable upwardly. For such purposes, the bracket means 60 includes pivot means such as a pair of hinges adjacent the side pieces 63 and 64. The hinge adjacent the side piece 62 is indicated at 67. The upward position of the skirt is shown by the dotted lines 61 in FIG. 2.

I claim:

1. Cooking and broiling apparatus comprising:
   a body having a front section, a back section, and a pair of side sections;
   a heat source in said body;
   a grill disposed above said heat source, the grill having a front, a back, and a pair of sides respectively disposed adjacent the corresponding parts on said body with the back of the grill being substantially spaced from the back of the body;
   a pair of tracks respectively disposed on the sides of said body and supporting the grill in a generally horizontal position;
   on each track adjacent said front section, a barrier extending upwardly for engagement with the front of the grill;
   a tilt leg on the back of said grill and extending downwardly into said space;
   support means on the back of the body; and a tilt handle pivotally connected to the back of the grill, said handle including a section extending along the grill and a head section spaced from the front of the grill;
   the grill being tilted by (a) grasping the head section and rotating the tilt handle upwardly around said pivotal connection and then, (b) pulling back on the tilt handle so that the front of the grill engages said barriers and so that the grill rotates upwardly around the barriers until the bottom of said tilt leg is above said support means and then (c) while holding the grill in said tilted position pushing the grill and tilt handle toward the back of the body until the leg is above said support means, and then (d) moving the tilt handle to rotate the grill downwardly so that the tilt leg rests on the support means and maintains the grill in tilted position.

2. A construction in accordance with claim 1 further including a push-pull handle connected to the grill and including a section extending parallel to the front of the grill and wherein said head section is co-extensive with and rests on said parallel section when not being used for the tilting operation.

3. A construction in accordance with claim 1 wherein said heat source is a gas burner having a gas-feed tube and a control valve on the tube located adjacent the front section of the body and further including:

bracket means connected to the front section of the body; and a skirt connected to and supported to the bracket means, the skirt extending across the front of the body and having a pair of side pieces each extending toward and engaged with the front of the body, the bracket means and the side pieces maintaining the skirt away from the front of the body whereby to provide a passage for conducting air upwardly and over the control valve for purposes of cooling the valve.

4. A construction in accordance with claim 3 wherein said bracket means includes hinge means which permits the skirt to be tiltable upwardly away from the front of the body so as to provide easy access to said control valve.

5. A construction in accordance with claim 1 wherein said support means has two stages, one above the other, and engaging the leg with one stage tilts the grill at one angle and engaging the leg with the other stage tilts the grill at a different angle.

6. A construction in accordance with claim 1 wherein said grill comprises a plurality of bars extending between the front and the back and said tilt handle section is a bar and its pivotal connection to the back of the grill comprises an aperture in the back which is of larger dimension than the bar so as to allow freedom of motion of the bar and a pin in the bar to retain the same on the back of the grill.

* * * * *